Jan. 5, 1926.　　　　　　　　　　　　　　　1,568,566
F. A. MILLER
TRANSMISSION BAND
Filed July 28, 1924
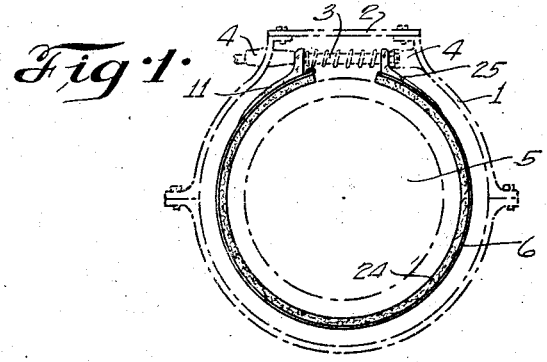
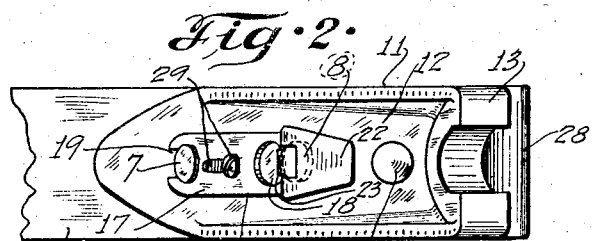
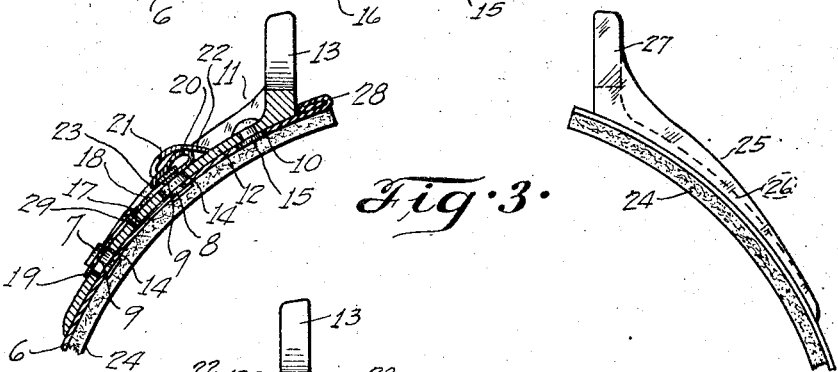
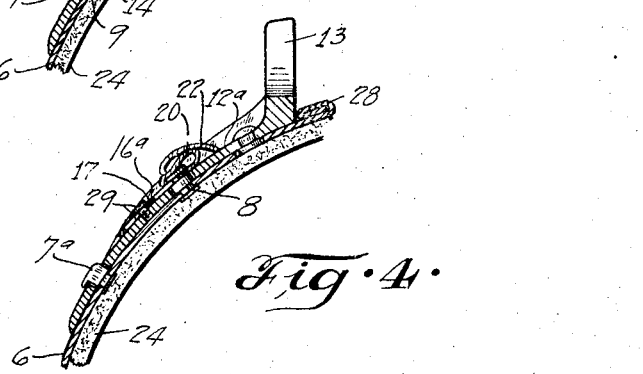
INVENTOR
Fred A. Miller.
By
ATTORNEY Patented Jan. 5, 1926.

1,568,566

UNITED STATES PATENT OFFICE.

FRED A. MILLER, OF ST. LOUIS, MISSOURI, ASSIGNOR OF ONE-HALF TO DAVID E. PARKS AND ONE-HALF TO WALTER T. BOHNE, BOTH OF ST. LOUIS, MISSOURI.

TRANSMISSION BAND.

Application filed July 28, 1924. Serial No. 728,607.

*To all whom it may concern:*

Be it known that I, FRED A. MILLER, a citizen of the United States, residing at the city of St. Louis, State of Missouri, have invented a certain new and useful Improvement in Transmission Bands, of which the following is a specification, reference being had to the accompanying drawing, forming a part thereof.

This invention relates generally to automobiles and, more particularly, to a certain new and useful improvement in automobile transmission bands.

Considerable trouble, inconvenience, and expense accompany today, so far as I am aware, the removal and repair or replacement of worn or broken transmission bands of especially automobiles of a certain type; and it is the chief object of my present invention to provide a transmission band especially adapted for use in connection with automobiles of the type mentioned which is of simple and efficient form and construction and which is detachable or removable for repair or replacement with ease, convenience, and little expense.

With the above and other objects in view, my present invention resides in the novel features of form, construction, arrangement, and combination of parts hereinafter described and pointed out in the claims.

In the accompanying drawing,

Figure 1 is a side elevational view of a transmission-band embodying my invention, illustrated in connection with a transmission-case of an automobile of present well-known construction;

Figure 2 is an enlarged fragmental plan view of the band;

Figure 3 is a fragmental view of the band partly in side elevation and partly in longitudinal section; and Figure 4 is a fragmental longitudinal sectional view of a slightly modified form of transmission-band embodying my invention.

Referring now more in detail and by reference characters to the drawing, I have, for the purpose of illustrating a practical embodiment of my invention, shown the band in connection with a standard automobile construction of which 1 is the transmission-case having the usual removable lid or cover 2, 3 the band-engaging pedal-actuated clutch and slow-speed shaft, 4—4 the bearings for the shaft 3, and 5 one of the gear-drums. The band proper 6 is constructed of suitable spring steel and is of the usual split-ring form.

With reference now first to the preferred form of the band illustrated in Figures 1, 2 and 3, fixed in suitably spaced so-called tandem relation upon the outer face of one end portion of the band 6, is preferably a pair of upstanding studs 7, 8, each having an annular groove 9 intermediate its ends; and formed in band 6 preferably intermediate the stud 8 and the adjacent end of the band, is an aperture or recess 10, all for purposes shortly appearing.

Adapted for co-operation with band 6, is what I designate as an ear 11, which includes a rigid shank 12 arcuated longitudinally to conform to the normal curvature of the end-portion of band 6, and a bifurcated or notched head 13 angularly upstanding from the forward end of shank 12, as shown. Within its length, the ear-shank 12 is formed or provided with a corresponding pair of similarly spaced apertures or openings 14 adapted to accommodate the band-studs 7 and 8, and upon its under face the ear-shank 12 is provided with a projecting short pin or stud 15 adapted to removably fit snugly within the band-aperture or recess 10.

Adapted for ear-securing engagement with the band 6 and ear 11, is a so-called detachable latch 16, best seen in Figure 2, which, as there shown, includes a body-portion 17 of dimensions and suitably lengthwise arcuated and shaped to fit smoothly upon the upper face of shank 12 and formed within its length with a so-called key-hole slot 18 for co-operative engagement with the band-stud 8 and longitudinally notched, as at 19, at its one or so-called rear end for co-operative engagement with the other band-stud 7. At its other or so-called forward end, and it will be noted that the smaller or reduced portion of its slot 18 is disposed toward such latter end, the latch 16, which is preferably of suitable metallic material, is first doubled rearwardly for a short distance upon itself, as at 20, then reversely or forwardly doubled, as at 21, and then gradually bent downwardly to provide a somewhat spring tongue 22 projecting obliquely forwardly of the body of the latch and the free end of which is normally disposed in a plane slightly below the plane of the under face of the body of the latch for yielding engagement with the upper face of the ear-shank 12, for purposes shortly appearing. At the double or joint between the latch-portions 20 and 21, the metal of the latch is cut-away and upset or bent to provide a downwardly presented spring-hook 23 disposed in spaced relation over the neck of the latch-slot 18 for locking-engagement with the head of the band-stud 8 when the latch is in ear-locking engagement with the band and ear.

Disposed upon the inner face of band or ring 6, is the usual lining 24, and riveted or otherwise fixed upon the outer face of the band 6 and upon its other or opposite end, is a second ear 25 likewise including a suitably longitudinally arcuated shank 26 and an angularly-disposed bifurcated or notched head 27 substantially similar to and for co-operation with head 13 of ear 11.

In use or operation, and in assembling the transmission, case-cover 2 is removed, and a band 6 having a fixed ear 25 is disposed within the case 1 and around the drum 5. An ear 11 is then disposed upon the band 6, as seen in Figures 2 and 3, with its stud 15 in the band-aperture 10 and the band-studs 7 and 8 projecting upwardly through the shank accommodating apertures or openings 14.

A latch 16 is then disposed upon the shank 12 of ear 11 with its notched end 19 presented toward the band-stud 7 and engaging at the larger portion of its slot 18 with the band-stud 8. The latch 16 is then slidably moved or actuated longitudinally toward the end of ear 11 opposite its head 13, whereupon the latch 16 engages at its notched-end 19 in the groove 9 of band-stud 7 and at the reduced portion of its slot 18 in the groove 9 of the stud 8, its hook 23, at the same time, both through its own resiliency and through yielding pressure imparted thereto by the latch-tongue 22 in its engagement with the upper face of the shank 12 of the ear, springing into locking engagement with the head of stud 8, as clearly seen in Figure 3. The ear 11, as so mounted and secured, is rigidly and firmly held against both lateral and longitudinal movement upon or relatively to the band and in co-operative relation with the head 27 of the opposite ear 25 previously fixed upon the band. The band is then engaged at its ears 13 and 27 with its actuating mechanism, that is to say, its drum clutching and release mechanism, including the shaft 3, which is disposed through the notches of the heads of the ears, as seen in Figure 1.

Should later the lining 24 become worn or the band 6 otherwise require repair or replacement, the case-cover 2 only is removed, the shaft 3 of the ear-actuating mechanism removed, and the latch 16 suitably disengaged, when the detachable ear 11 may be conveniently lifted from the band and the band pulled endwise at its fixed ear 25 from around its encircled drum 5.

My new band is simple in form and construction, may with ease and convenience be included in the assembly or removed for repair or replacement, and greatly facilitates the inexpensive repair and correction of transmission troubles arising from worn or defective bands.

The modified form of the band illustrated in Figure 4 is substantially identical with the preferred form of the band illustrated in Figures 1, 2 and 3, with the exception, however, that the latch 16$^a$ is reduced in length somewhat relatively to the length of latch 16 for engagement merely with the one band-stud 8, and the grooved-stud 7 replaced by a hook-stud 7$^a$ adapted for holding engagement with the ear-shank 12$^a$, as shown.

Preferably, in both forms of the band, the band proper 6 at the end thereof equipped for engagement with its detachable ear is suitably bent or doubled upon itself, as at 28, to provide or form a pulling point, in addition to the several described studs, for the ear upon the band in the contracting actuations of the band into clutching engagement with its encircled drum 5. Preferably also both latches 16 and 16$^a$ are slotted longitudinally for loose engagement with a screw-member or the like upstanding from the shank of the ear. In such manner the latches 16 and 16$^a$, respectively, have slot-and-pin connection with the shank of the ear, as at 29, which, while permitting convenient slidable actuation of the latches into and out of ear-locking engagement with the ear and band, avoid accidental displacement of the latch.

It is to be understood that changes in the form, construction, arrangement, and combination of the several parts of my new band may be made and substituted for those herein shown and described without departing from the nature and principle of my invention.

Having thus described my invention, what I claim and desire to secure by Letters Patent is:

1. An automobile transmission-band comprising, in combination, a split ring, an ear having an apertured shank arcuated to conform to the curvature of the ring and adapted at its shank to removably fit upon the ring, an annularly grooved stud on the band projecting through the aperture of the shank, and a locking-member adapted for releasable engagement over the shank with said stud both at its groove and head for detachably securing the ear to and upon the band.

2. An automobile transmission-band comprising, in combination, a split ring, an ear having an apertured shank arcuated to conform to the curvature of the ring and adapted at its shank to removably fit upon the ring, a stud on the band projecting through the aperture of the shank, and a locking member adapted for slidable movement upon the ear for detachably fastening the ear to and upon the band, the locking member including a yielding hook adapted for engagement with the head of the stud.

3. An automobile transmission-band comprising, in combination, a split ring, an ear having an apertured shank arcuated to conform to the curvature of the ring and adapted at its shank to removably fit upon the ring, a stud on the band projecting through the aperture of the shank, and a locking member adapted for slidable movement upon the ear for detachably fastening the ear to and upon the band, the locking member including a yielding hook adapted for engagement with the head of the stud, and a spring tongue adapted for engagement with the ear for depressing the hook into engagement with the stud.

4. An automobile transmission-band comprising, in combination, a split ring, an ear having an apertured shank arcuated to conform to the curvature of the ring and adapted at its shank to removably fit upon the ring, an annularly grooved stud on the band projecting through the aperture of the shank, and a latch-member for detachably securing the ear to and upon the band, said latch-member being slotted for engagement over the shank with the stud at its groove and having a hook for engagement with the stud at its head.

5. An automobile transmission-band comprising, in combination, a split ring, an ear having an apertured shank arcuated to conform to the curvature of the ring and adapted at its shank to removably fit upon the ring, an annularly grooved stud upon the band projecting through the aperture of the shank, and a locking-member adapted over the shank both for releasable engagement with the stud at its groove and sprung hook-engagement with the stud at its head for detachably securing the ear to and upon the band.

6. An automobile transmission band comprising, in combination, a split ring, an ear having an apertured shank arcuated to conform to the curvature of the ring and adapted at its shank to removably fit upon the ring, an annularly grooved stud upon the band projecting through the aperture of the shank, and a locking member for detachably securing the ear to and upon the band, the locking member being slotted for slidable engagement with the stud at its groove and having a spring hook for engagement with the head of the stud, the locking-member also having a projecting spring-tongue adapted for engagement with the ear for depressing the hook into engagement with the stud.

7. An automobile transmission-band comprising, in combination, a split-ring, an ear having a shank apertured intermediate its ends and adapted at its shank to fit upon the ring, a pair of annularly grooved studs on the band projecting through the apertures of the shank, and a latch-member for detachably securing the ear to and upon the band, the latch-member being adapted for engagement intermediate its ends with one of said studs at both the slot and head thereof and engagement at its one end with the other stud at the groove only thereof.

In testimony whereof, I have signed my name to this specification.

FRED A. MILLER.